(12) United States Patent
Kim

(10) Patent No.: US 9,343,932 B2
(45) Date of Patent: May 17, 2016

(54) MOTOR

(71) Applicant: LG INNOTEK CO., LTD., Seoul (KR)

(72) Inventor: Jinho Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 212 days.

(21) Appl. No.: 13/935,235

(22) Filed: Jul. 3, 2013

(65) Prior Publication Data

US 2014/0009017 A1 Jan. 9, 2014

(30) Foreign Application Priority Data

Jul. 4, 2012 (KR) .................. 10-2012-0072667

(51) Int. Cl.
| | |
|---|---|
| *H02K 21/12* | (2006.01) |
| *H02K 1/27* | (2006.01) |
| *H02K 1/30* | (2006.01) |
| *H02K 7/102* | (2006.01) |
| *H02K 7/10* | (2006.01) |

(52) U.S. Cl.
CPC .............. *H02K 1/274* (2013.01); *H02K 1/278* (2013.01); *H02K 1/30* (2013.01); *H02K 7/10* (2013.01); *H02K 7/102* (2013.01)

(58) Field of Classification Search
CPC ............................. H02K 1/274; H02K 1/278
USPC ............. 310/156.28, 156.29, 156.47, 37, 83
See application file for complete search history.

(56) References Cited

U.S. PATENT DOCUMENTS

| | | | | |
|---|---|---|---|---|
| 4,674,178 | A * | 6/1987 | Patel | 29/598 |
| 6,492,755 | B1 * | 12/2002 | Jones | 310/156.12 |
| 7,741,747 | B2 * | 6/2010 | Yamamura et al. | 310/156.28 |
| 2006/0244335 | A1 * | 11/2006 | Miyazaki et al. | 310/216 |
| 2007/0138891 | A1 * | 6/2007 | Hurst | 310/156.28 |
| 2008/0238234 | A1 * | 10/2008 | Saban et al. | 310/156.28 |
| 2012/0074807 | A1 * | 3/2012 | Burton et al. | 310/156.28 |
| 2012/0146439 | A1 * | 6/2012 | Gibas et al. | 310/83 |
| 2012/0187792 | A1 * | 7/2012 | Maruyama | 310/156.28 |
| 2012/0187793 | A1 * | 7/2012 | Hartmann et al. | 310/156.28 |

* cited by examiner

*Primary Examiner* — Hanh Nguyen

(74) *Attorney, Agent, or Firm* — Saliwanchik Lloyd & Eisenschenk

(57) ABSTRACT

A motor is disclosed, the motor including a housing, a stator mounted on the housing, and including a stator core having a plurality of teeth, an insulator and a coil, a rotor core rotatatively disposed at a center of the stator and centrally having a space unit, and a magnet module mounted on a surface of the rotor core, wherein the magnet module includes a plurality of magnets each having a predetermined size, and a guide plate having an embossed unit accommodated by the plurality of magnets and attached to an inner surface of the magnet.

9 Claims, 6 Drawing Sheets

MOTOR

CROSS-REFERENCE TO RELATED APPLICATION

This application claims the benefit under 35 U.S.C. §119 of Korean Application No. 10-2012-0072667, filed Jul. 4, 2012, which is hereby incorporated by reference in its entirety.

BACKGROUND

1. Field of the invention

The present disclosure relates to a motor.

2. Description of Related Art

In general, a brushless motor can generate an electric power by an electric interaction between a stator wound with a coil and a rotor having a magnet centrally arranged at the stator. At this time, the magnet mounted on the motor may be installed at a surface of a rotor core or may be installed at a pocket inside the rotor core.

In a case a magnet is installed on a surface of a dual rotor core, the magnet is bonded to the surface of the rotor core using an adhesive, where the magnet is generally adhered to the surface of the rotor core by arranging a plurality of magnet members each having a same size.

A rotor, in which a rotation shaft is press-fitted into a center of the rotor core, may have a guide rib on the surface of the rotor core for restricting an adhesion position of the magnet as the rotor core has an allowable thickness, or may allow the magnet to be adhered/fixed into a groove by forming the groove of a predetermined size.

However, in a case a tube-type rotor required with a space at a center of the rotor core for changing a rotational power of the rotor to a linear reciprocal motion, the rotor core generally has a thin thickness like a pipe, and is centrally disposed with a space unit, making it difficult to form a guide rib or a magnet accommodation groove for attaching the magnet, and therefore a magnet is attached on to the surface of a smooth tube type rotor core.

In a case the magnet attached on to the surface of the smooth tube type rotor core, it is difficult to maintain position accuracy between magnets due to difficulty in adhering/fixing the magnets each at a predetermined gap. Another disadvantage is that separate disengagement prevention means must be provided to inhibit the magnets from being disengaged at a high speed rotation region because the magnets are attached on the smooth tube type rotor core.

In case of disengagement prevention coating formed by injection molding using a large quantity of resin, resin cannot be generally formed with a thick thickness for maintaining the motor performance more than a predetermined level to make it difficult to obtain a sufficient magnet disengagement prevention effect.

BRIEF SUMMARY

Exemplary aspects of the present disclosure are to substantially solve at least the above problems and/or disadvantages and to provide at least the advantages as mentioned below.

Thus, the present disclosure is directed to provide a motor configured to enable an accurate attachment/fixing of a magnet on to a surface of a tube type rotor core and improved in structure to inhibit the magnet from being separated from the surface of the rotor core.

In one general aspect of the present disclosure, there is provided a motor, the motor comprising: a housing; a stator mounted on the housing, and including a stator core having a plurality of teeth, an insulator and a coil; a rotor core rotatatively disposed at a center of the stator and centrally having a space unit; and a magnet module mounted on a surface of the rotor core, wherein the magnet module includes a plurality of magnets each having a predetermined size, and a guide plate having an embossed unit accommodated by the plurality of magnets and attached to an inner surface of the magnet.

Preferably, but not necessarily, the rotor core may take a shape of a tube has a space unit therein.

Preferably, but not necessarily, the space unit may be mounted with a nut member at an inner surface with a screw thread and may be rotated in association with rotation operation of the rotor core.

Preferably, but not necessarily, the guide plate is a thin plate of metal material, and the guide plate may be provided with a body having an upper/bottom-opened cylindrical shape corresponding to a periphery of the rotor core and an embossed unit having a shape corresponding to the magnet, where the body and the embossed unit are integrated.

Preferably, but not necessarily, the guide plate may be provided with an embossed unit is a thin plate of metal material and having a shape corresponding to that of the magnet, and being bent to have a curvature corresponding to the periphery of the rotor core.

Preferably, but not necessarily, the motor may further comprise: a ring accommodation unit disposed at a distal end of one side of the guide plate; and a ring member coupled to the ring accommodation unit to inhibit the guide plate from being opened.

Preferably, but not necessarily, the rotor core and the magnet module may be fixed by using an adhesive.

Preferably, but not necessarily, at least two or more magnet modules may be provided, where each of the magnet modules may have magnets, each magnet having a same polarity relative to an axial direction of the rotor core, and each of the magnet modules including magnets, each magnet having skew portion which being skewed at a predetermined angle relative to an axial direction of the rotor core.

The exemplary embodiments of the present disclosure have an advantageous effect in that a magnet module formed with by bonding and fixing a magnet to a thin-plated guide plate formed with an embossed unit for guiding an arrangement position of the magnet is bonded and fixed to a tube type rotor core to improve a magnet bonding workability.

The exemplary embodiments of the present disclosure have another advantageous effect in that position accuracy among magnets can be enhanced by bonding and fixing the magnet using the guide plate.

The exemplary embodiments of the present disclosure have still an advantageous effect in that the magnet is inhibited from being separated from the rotor core at a high speed region, because the guide plate is arranged at a periphery of the rotor core, and the magnet is fixedly bonded to an inner surface of the guide plate.

BRIEF DESCRIPTION OF THE DRAWINGS

The teachings of the present disclosure can be readily understood by considering the following detailed description in conjunction with the accompanying drawings, in which.

DETAILED DESCRIPTION

Now, a motor according to exemplary embodiments of the present disclosure will be described with reference to the accompanying drawings.

Figure 1:
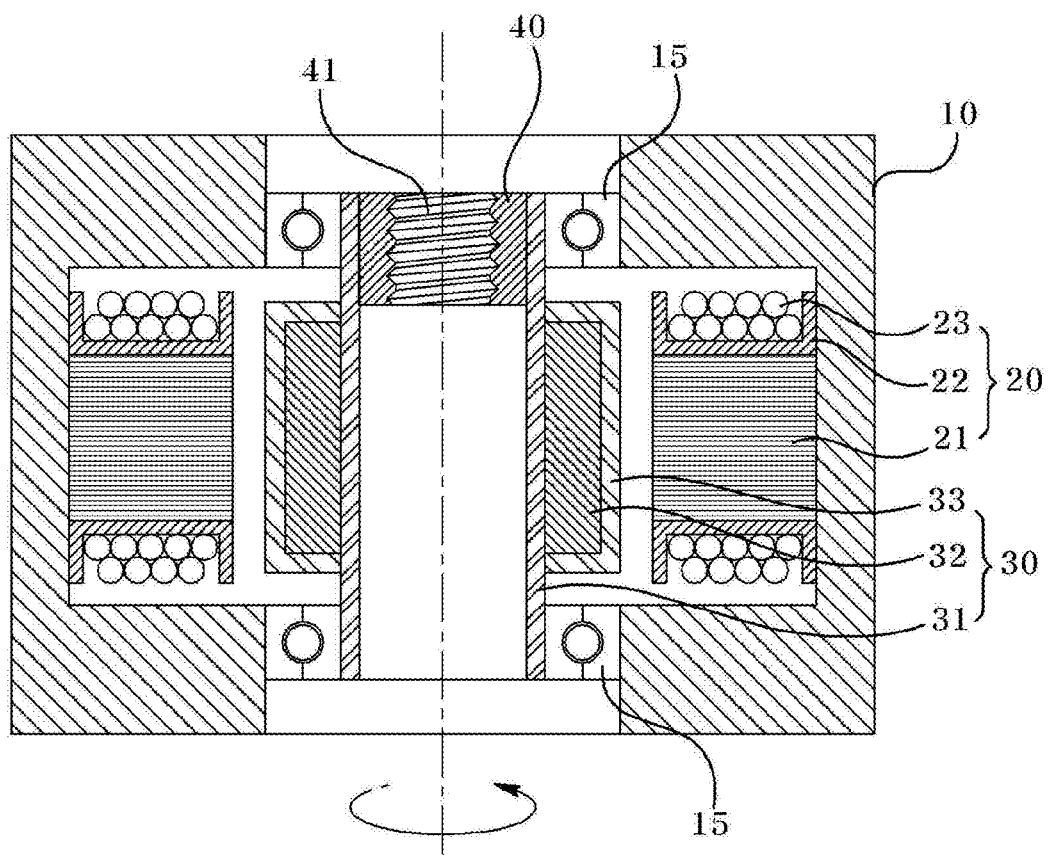
FIG. 1 is a schematic cross-sectional view illustrating configuration of a motor according to an exemplary embodiment of the present disclosure.
Figure 2:
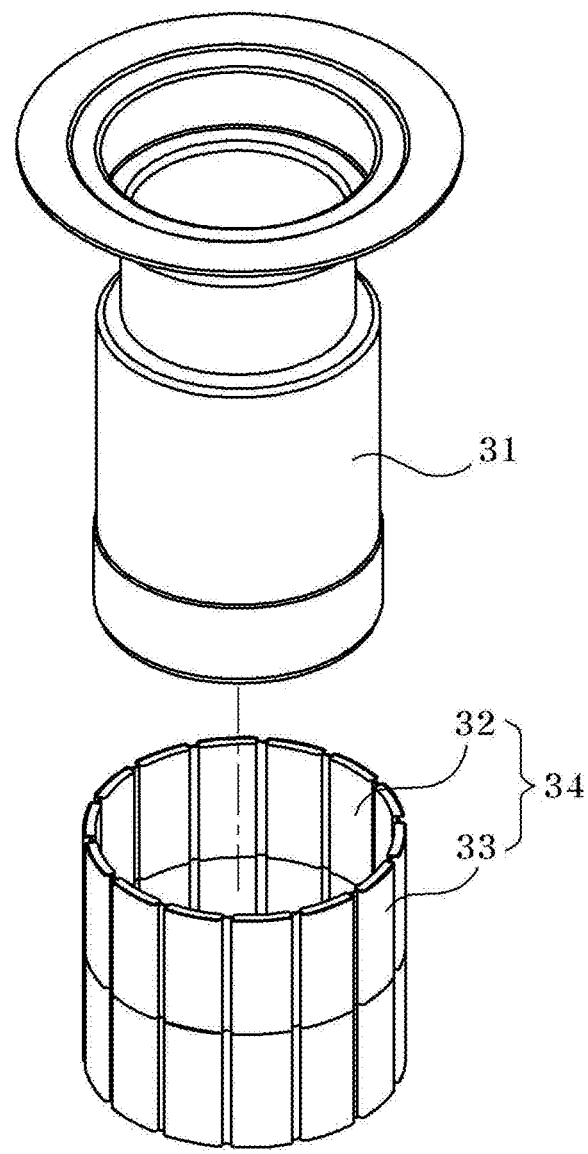
FIG. 2 is an exploded perspective view illustrating a state in which each of polarity-matched magnet modules is inserted into a tube type rotor core according to an exemplary embodiment of the present disclosure.
Figure 3:
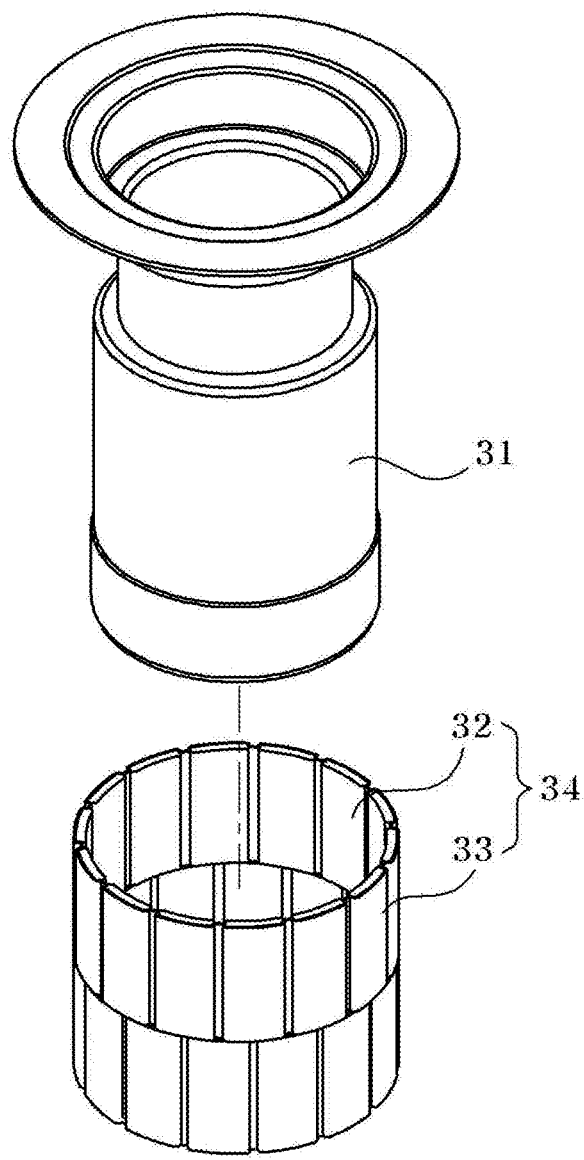
FIG. 3 is an exploded perspective view illustrating a state in which each skewed magnet module is inserted into a tube type rotor core according to an exemplary embodiment of the present disclosure.
Figure 4:
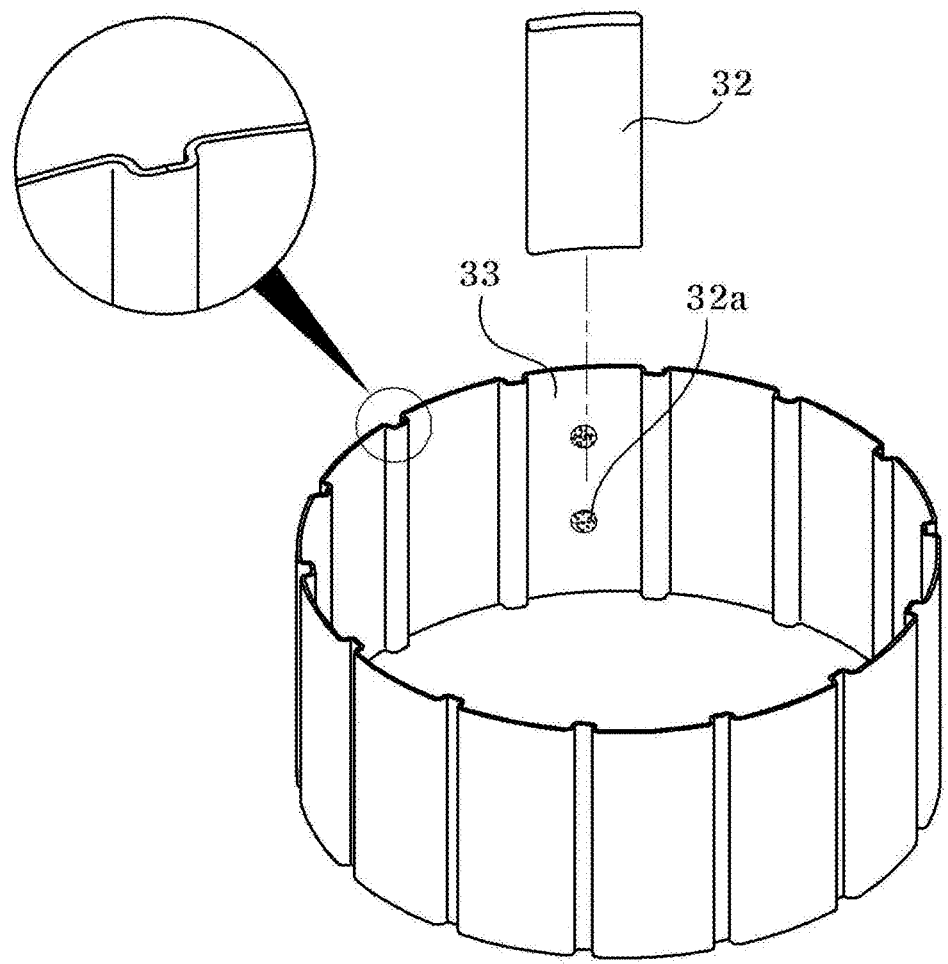
FIGS. 4 to 6 are exploded perspective views illustrating a magnet module according to first, second and third exemplary embodiments of the present disclosure.
Figure 5:
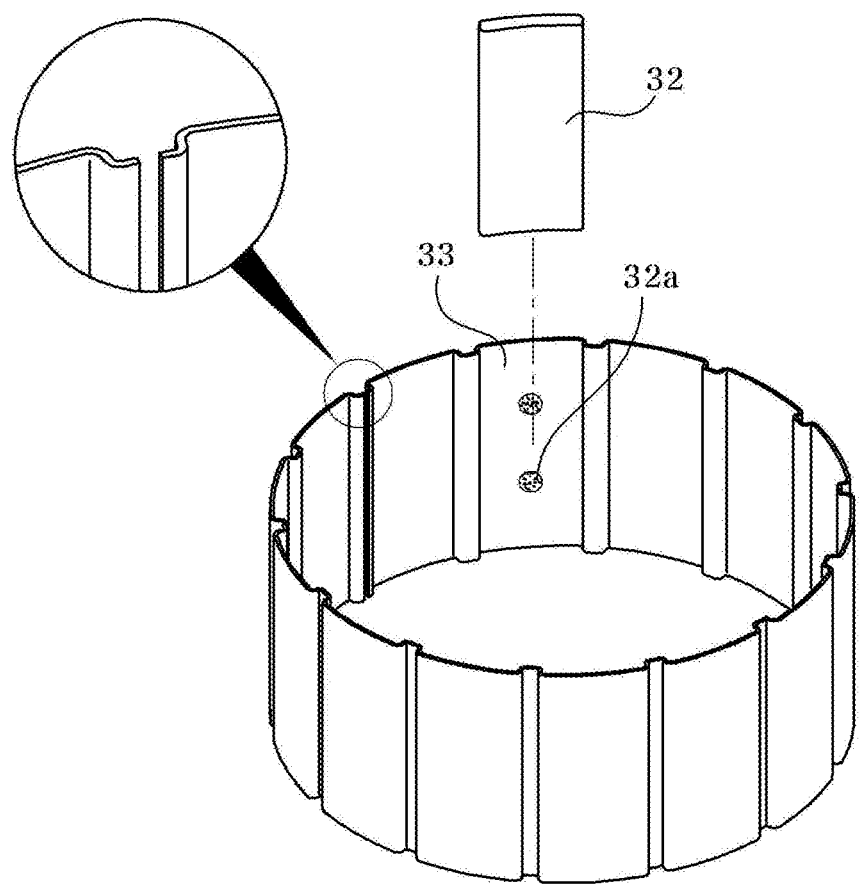
Figure 6:
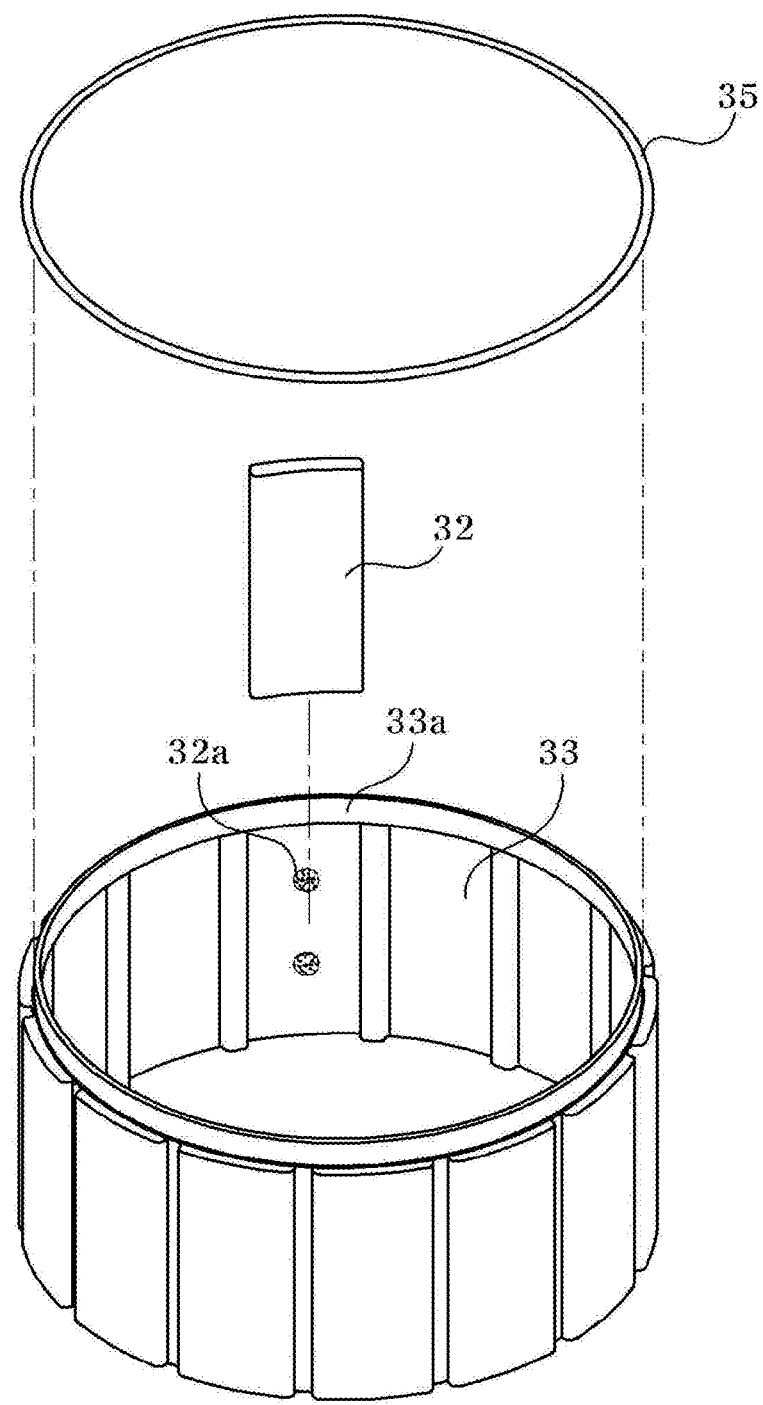

FIG. 1 is a schematic cross-sectional view illustrating configuration of a motor according to an exemplary embodiment of the present disclosure, FIG. 2 is an exploded perspective view illustrating a state in which each of polarity-matched magnet modules is inserted into a tube type rotor core according to an exemplary embodiment of the present disclosure, FIG. 3 is an exploded perspective view illustrating a state in which each skewed magnet module is inserted into a tube type rotor core according to an exemplary embodiment of the present disclosure, and FIGS. 4 to 6 are exploded perspective views illustrating a magnet module according to first, second and third exemplary embodiments of the present disclosure.

Referring to FIG. 1, a motor according to an exemplary embodiment of the present disclosure includes a housing (10), a stator (20) and a rotor (30).

Referring to FIG. 1 again, the housing takes a shape of a cylinder, and includes an upper side-opened opening unit, through which the stator (20) and the rotor (30) can be inserted and coupled. The housing (10) is formed at a floor surface with a through hole, and a lead screw (not shown) mounted at a center of the rotor (30) can be reciprocally mounted. Furthermore, the upper side opening unit may be closed by a cover member.

The housing (10) may be mounted at an inner space with the stator (20) wound with a plurality of coils. The stator (20) may include a stator core (21), an insulator (22) and a coil (23).

The stator core (21) may be provided with a block of metal material, and may be formed by stacking plural sheets of core members each member being made of a thin plate material. The stator core (21) may be formed with a plurality of teeth protruded toward a surface opposite to the rotor (30), and each tooth is wound with the coil (23) via the insulator (22).

The insulator (22) is coupled to each of upper and bottom surfaces of the stator core (21) and serves to insulate lest the coil (23) wound on the teeth should be electrically conducted. The insulator (22) may be formed with a resin material.

Referring to FIG. 1 again, the rotor (30) includes a rotor core (31) provided in a thin thickness tube shape, and a magnet module (34) bonded and fixed to a surface of the rotor core (31).

The rotor core (31) in a tube type shape may be rotatably mounted on the housing (10) via a bearing (15). Referring to FIGS. 1, 2 and 3, the rotor core (31) is preferably formed at a center with a space unit. In order to transfer a power generated by rotation of the rotor core (31) to a linear reciprocal motion, a nut member (40) may be centrally formed at the rotor core (31). The nut member (40) may be formed at an inner surface with a screw thread (41), and in a case the rotor core (31) is rotated, the nut member (40) is rotated in association with the rotor core (31), whereby a lead screw (not shown) formed at a periphery of a tap screwed to the screw thread (41) can be reciprocally moved.

The motor having the tube type rotor core (31) and the nut member (40) may be used for various purposes, and one of the examples is that the motor can be used for reciprocally moving a lead screw for pressing a master cylinder of a brake system. That is, in a case the rotor core (31) is rotated, the nut member (40) is rotated in association with the rotor core (31), whereby the screw thread (41) formed at an inner surface of the nut member (40) may be rotated to axially move the lead screw (not shown) and to convert a rotational force of the motor to a linear motion.

The magnet module (34) may include a plurality of magnet members (32) and a guide plate (33) for inhibiting the magnet member from being disengaged and for guiding an adhesion position.

Now, referring to FIG. 2, at least two magnet modules (34) are provided where each of the magnet modules (34) is formed with magnets, each magnet having a same polarity relative to an axial direction of the rotor core, or each of the magnet modules is formed with magnets, each magnet formed by being skewed at a predetermined angle relative to an axial direction of the rotor core.

Each of the magnet members (32) may provided with a same size, and may be formed with a curvature corresponding to the periphery of the tube-shaped rotor core (31).

The guide plate (33) may be formed with a thin plate of metal material, and according to a first exemplary embodiment of the present disclosure, the guide plate (33) may be formed in a shape of an integrated cylinder, as shown in FIG. 4. At this time, as shown in the partially enlarged view of FIG. 4, the guide plate (33) can inhibit a connected fixing of a joint from being disconnected during a high speed of rotation because no joint is formed on the guide plate (33). In this case, the guide plate (33) may be formed at one time by being formed with an embossed magnet accommodation unit each embossing having a same size using a metallic mold.

Then, an adhesive (32a) is coated on an inner surface of the magnet accommodation unit and the magnet (32) is attached thereto to allow being inserted and coupled to an axial direction of the rotor core (31) as shown in FIG. 2 or FIG. 3. At this time, the magnet module (34) and the rotor core (31) may be fixed using the adhesive.

According to a second exemplary embodiment of the present disclosure, the guide plate (33) may be also formed by forming an embossed magnet accommodation unit, each embossing having a same size, through a press-work of a thin plate, and by bending in a ring shape having a curvature corresponding to that of a periphery of the rotor core (31). In this case, as shown in FIG. 5 showing an enlarged portion, both distal ends of the bent guide plate (33) may be made to face each other, but may not be connected.

According to this configuration, an adhesive is coated on a periphery of the rotor core (31), and the guide plate (33) bonded/fixed by the magnets (32) may be wound to a circumferential direction and fixed thereby. According to this configuration, there is no fear of the magnet (32) and the rotor core (31) being mutually interfered in the process of installing the magnet module (34) to the rotor core (31), whereby the magnet (32) can be easily installed.

According to a third exemplary embodiment of the present disclosure, a ring accommodation unit (33a) is formed at a distal end of one side of the guide plate (33), and a ring member (35) may be also inserted into the ring accommodation unit (33a) to inhibit the guide plate (33) from being opened.

That is, in a case the rotor (30) is rotated at a high speed, the magnet (32) may be disengaged from the rotor core (31) due to a joint or a thin part of the guide plate (33) formed according to the first or second exemplary embodiment of the present disclosure being separated, such that, in a case the ring member (35) is coupled to the ring accommodation unit (33a) formed at the distal end of the guide plate (33), the guide plate (33) can be inhibited from being opened.

According to the present disclosure, an assembling workability of rotor (30) can be advantageously improved due to absence of cumbersomeness of attaching each of the magnets (32) one by one to a surface of rotor core (31), because the magnet module (34) is bonded and fixed to the tube type rotor core (31), where the magnet module (34) is formed on the embossed thin plate-shaped guide plate (33) by bonding and fixing the magnet (32) using the adhesive (32a) in order to guide an arrangement position of the magnet (32).

According to the present disclosure, position accuracy among magnets (32) can be enhanced by uniformly bonding and fixing the magnet using the guide plate (33).

According to the present disclosure, the magnet (32) can be inhibited from being separated from the rotor core (31) at a high speed region, because the guide plate (33) is arranged at a periphery of the rotor core (31), and the magnet (32) is fixedly bonded to an inner surface of the guide plate (33).

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A motor, the motor comprising:
    a housing;
    a stator disposed in the housing, and including a stator core, a coil wound at the stator core;
    a rotor core rotatably disposed at an inner side of the stator;
    a magnet disposed on an outer surface of the rotor core;
    a guide plate having an embossed unit accommodating the magnet;
    a ring accommodation unit extended from a distal end of one side of the guide plate and disposed along the outer surface of the rotor core; and
    a ring member disposed along an outer surface of the ring accommodation unit.

2. The motor of claim 1, wherein the rotor core takes a shape of a tube having the space portion therein.

3. The motor of claim 1, wherein the guide plate is a thin plate of metal material.

4. The motor of claim 3, wherein the guide plate is provided with a body having an upper/bottom-opened cylindrical shape corresponding to a periphery of the rotor core and the embossed unit having a shape corresponding to the magnet, where the body and the embossed unit are integrated.

5. The motor of claim 1, wherein the guide plate is provided with the embossed unit having a thin plate of metal material and having a shape corresponding to that of the magnet, and including bent to have a curvature corresponding to the periphery of the rotor core.

6. The motor of claim 1, wherein the rotor core and the magnet are fixed by an adhesive.

7. The motor of claim 1, wherein the magnet includes a first magnet and a second magnet disposed with the first magnet at an axial direction of the rotor core.

8. The motor of claim 7, wherein the first magnet and the second magnet have a same polarity relative to the axial direction of the rotor core.

9. The motor of claim 7, wherein the first magnet and the second magnet each has a skew portion that is skewed at a predetermined angle relative to the axial direction of the rotor core.

* * * * *